Patented Oct. 26, 1937

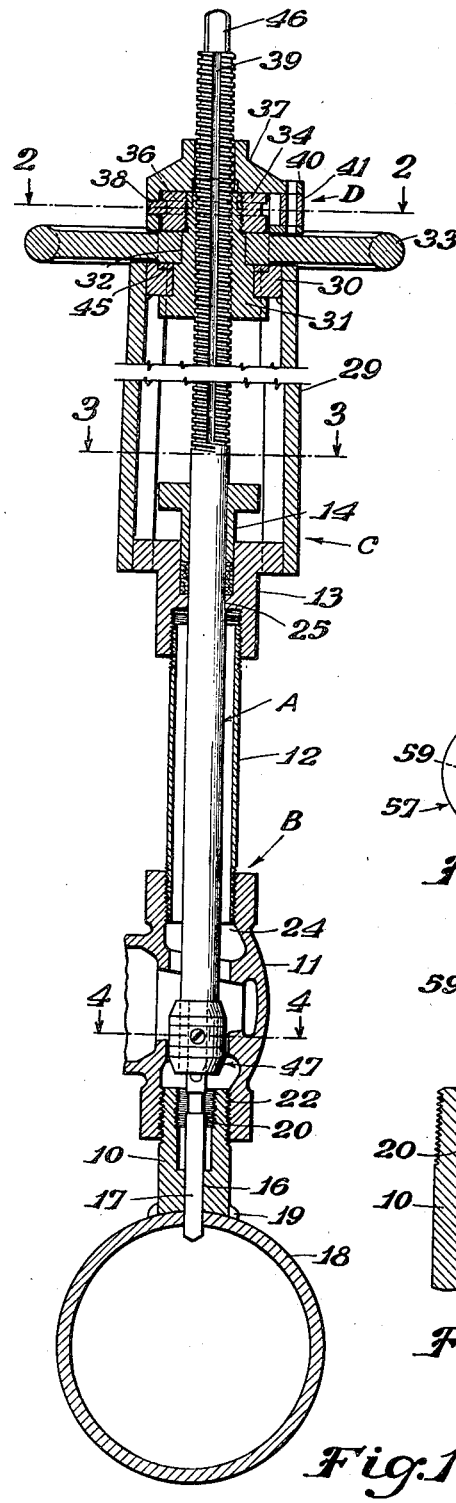
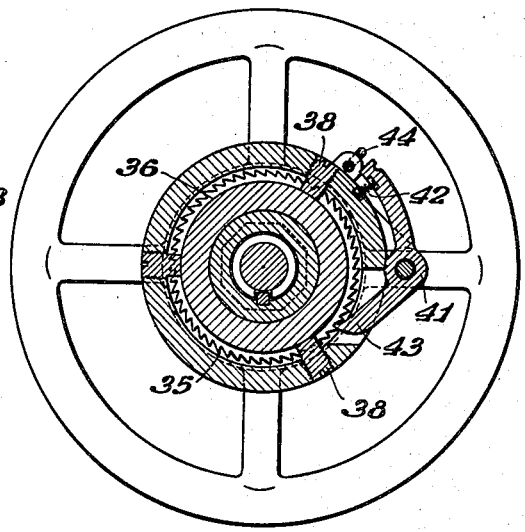
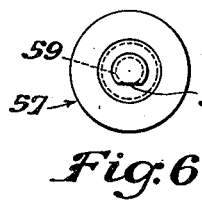
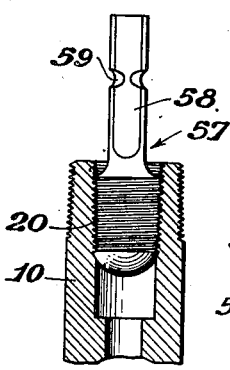
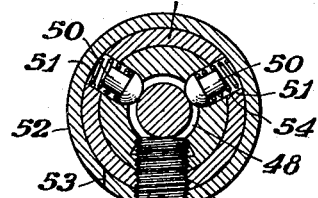
Fig. 1  Fig. 2  Fig. 3  Fig. 4  Fig. 5  Fig. 6
Inventors:—
James Edwin Polston
Arthur Miller Hill
By Lyle S. Motley Atty.

2,097,398

UNITED STATES PATENT OFFICE 2,097,398

PIPE TAPPING APPARATUS

James Edwin Polston, Shawnee, and Arthur Miller Hill, Tulsa, Okla., assignors to Stanolind Pipe Line Company, Tulsa, Okla., a corporation of Maine Application June 5, 1937, Serial No. 146,552

8 Claims. (Cl. 77—40)

The present invention relates to a pipe tapping and plugging apparatus adapted to tap and plug a pipe containing fluid under pressure.

It is an object of the present invention to provide a new and improved apparatus for tapping and plugging a pipe containing fluid under pressure, without the loss of fluid.

It is a further object of this invention to provide a new and improved arrangement for advancing and retracting the drill spindle of a pipe tapping and plugging apparatus which will facilitate the drilling operation, conducted through a gate valve, as well as the subsequent installation of a plug below the gate valve and which will permit the ready removal of both the gate valve and the drilling device, after the plug is installed.

This invention has as a still further object, providing the spindle of a pipe tapping and plugging apparatus with an improved socket for receiving interchangeably the stem of a drill and the stem of a plug and resiliently restraining the same against egress from the socket whereby the plug may be inserted below the gate valve, the spindle retracted, and the gate valve together with that portion of the tapping machine above the gate valve removed.

Other and still further objects of our invention will become apparent as the description thereof proceeds.

The invention will best be understood by reference to the accompanying drawing in which:

Figure 1 is a longitudinal cross-sectional view of an apparatus showing a preferred embodiment of the invention.

Figure 2 is a cross-sectional view taken on line 2—2 of Figure 1 showing to advantage the detailed relationship of spindle nut, handwheel and ratchet mechanism.

Figure 3 is a cross-sectional view taken on line 3—3 of Figure 1 showing in greater detail the arrangement of the lower portion of the rigid frame.

Figure 4 is a cross-sectional view taken on line 4—4 of Figure 1 showing in greater detail the arrangement of parts comprising the socket.

Figure 5 is an elevation in section of the tubular connector showing the threaded plug in place therein.

Figure 6 is a plan view of the structure shown in Figure 5.

Referring to Figure 1, our pipe tapping and plugging device is composed of a long drill spindle A provided at one end with a novel socket arrangement for interchangeably receiving the stem of a drill and the stem of a threaded plug, an enclosing housing B for the intermediate and lower portion of the spindle adapted to be attached to the pipe which is to be tapped and plugged, a novel rigid frame C surmounted on the housing and supporting in a novel manner an improved mechanism D for advancing and retracting the spindle relative to the pipe, which arrangement makes the tapping of the pipe, the subsequent withdrawal of the drill and the insertion of the plug more readily accomplishable than heretofore possible with known devices.

With regard to specific detail, the housing for the intermediate and lower portion of the spindle comprises a base nipple or saddle 10, a gate valve 11 received thereon, a second tubular member or nipple 12, the lower end of which is mounted on the gate valve 11, the upper end of which receives lower supporting flange member 13 of rigid frame C. This flange member 13 carries a packing gland 14 providing a seal for the intermediate portion of a spindle A extending into the housing.

The tubular connector or base nipple 10 is preferably fabricated from a piece of solid cylindrical stock as by drilling a longitudinal opening 16 therethrough large enough to admit a pipe tapping drill 17. The lower end of the nipple 10 is shaped to fit the contour of the pipe 18 and attached thereto as by welding 19. The upper portion of the opening 16 is countersunk and provided with threads 20 for the eventual reception of a threaded plug as will hereinafter appear. The upper outer periphery of the nipple 10 is provided with threads 22 and receives thereon the lower port of gate valve 11. In certain cases there is sometimes a tendency on the part of the threads 20 and 22 to gall due to the heat incident to the welding operation but this may be readily overcome by plating both the saddle and plug with cadmium.

Connector 10 may be formed, if desired, with the usual flange or saddle (not shown) and may be fastened to the pipe by embracing connections passing about the pipe instead of being welded as shown. The upper port 24 of gate valve 11 has threaded thereto the lower end of tubular housing 12 on the other end of which is fastened the lower base flange 13 of rigid frame C. This base flange is formed with a central opening 25 for the reception of spindle A and is provided with suitable packing surrounding the spindle for sealing the device against loss of fluid. This packing arrangement consists in countersinking the upper portion of the opening 25 in base flange member 13 for the reception of packing material such as hemp above which there is inserted the packing gland 14. Stud bolts 26 are screwed into openings in the upper face of lower supporting flange member 13 and provided with nuts 27 which cooperate with the upper face of packing gland 14 for drawing the same down against the packing.

The outer periphery of the flange 13 is formed with a pair of opposed substantially ninety degree arcuate recesses 28 for the reception of upwardly extending side members 29 which are attached therein as by welding. These side members may be made from any suitable stock but it is preferred to form the same from longitudinal arcuate quarter sections of pipe, for example 4" ribbed pipe. The upper inner periphery of the side members 29 have attached thereto, as by welding, a support and bearing ring 30 of rectangular cross section.

A flanged spindle nut 31 is positioned for bearing engagement with supporting and bearing ring 30. A reduced portion 32 of spindle nut 31 has keyed thereto handwheel 33 for rotating the spindle nut about the spindle A for advancing and retracting it relative to the pipe. The outer periphery of spindle nut 31 above handwheel 33 receives interiorly threaded ratchet gear 34 which is screwed down against handwheel 33.

Ratchet gear 34 is formed with teeth 35 (Figure 2) about the outer periphery thereof and the peripheral channel 36 above the teeth. A ratchet gear housing 37 embraces ratchet gear 34 and is provided with radially disposed guide studs 38 passing through the wall thereof cooperating with the peripheral channel 36 in the ratchet gear 34 to prevent vertical movement of the ratchet housing relative to the ratchet gear. The ratchet housing is further provided with a key which rides in the vertical key way 39 on spindle A to prevent rotation of the ratchet housing relative to the spindle. The ratchet housing is formed with upper and lower bearing bosses 40 for the reception of pawl 41. Spring 42 is interposed between the end of pawl and ratchet housing for normally biasing the working end 43 of the pawl into engagement with the teeth 35 of the ratchet gear. The latch ring 44 is attached to the ratchet housing 37 and arranged to engage a depression on the arm of the pawl 41 for selectively restraining the pawl out of engagement with the ratchet teeth.

The lower end of the spindle A is provided with a novel socket 47 composed of a vertical cylindrical chamber 48 formed in the end of the spindle, a tubular collar 49 received tightly about the lower end of the spindle, and a pair of spring actuated retaining dogs 50 received in radially disposed openings 51 passing through both the collar 49 and the wall of the cylindrical chamber 48, these openings slightly converging adjacent the wall of the chamber 48 to limit the extent to which the retaining dogs protrude therein. The collar 49 has a peripheral groove passing thereabout in line with the radially disposed openings 51 and receives therein a spring steel collar 52 split at 53 to permit of being snapped into place to act as a seat and retainer for the restraining dog springs 54. A third lateral opening 55 symmetrically disposed relative to openings 51 and threaded for receiving set screw 56 therein for positively locking the stem of the drill 17 in place. Thrust washer 45 is interposed between the bearing ring 30 and the handwheel 33 to take up wear. The upper portion of spindle A is threaded for reception within spindle nut 31 and has its upper end suitably formed as with a square head 46 for cooperation with a wrench for turning the spindle.

Any desired drill may be employed but we prefer the usual form of blacksmith drill having a generally cylindrical stem with a flat side for cooperation with set screw 56 contained in the socket 47. We further provide the stem with a pair of depressions for cooperation with the retaining dogs of our novel socket whereby the drill may be inserted vertically into position and is automatically restrained from falling out of the socket. Our spring actuated socket retaining dog arrangement has a still greater significance as applied to the stem of the threaded plug as will appear.

A threaded plug 57 adapted to be received in the interiorly threaded portion 20 of the base nipple 10 is provided with a stem 58 adapted to fit within the socket 47 of the spindle. This stem also has formed therein a pair of depressions 59 corresponding in position to the retainer dogs 50 of the socket. This particular retainer arrangement as applied to the insertion of the plug 57 after the pipe has been tapped has the advantage of restraining the stem from becoming disengaged from the socket, particularly when lowering the plug into position, but at the same time makes it possible to withdraw the spindle and socket out of engagement with the plug after the same has been inserted tightly in the threaded portion 14 of stem 11 as will appear. Since set screw 56 cannot be used when installing the plug 57 the importance of resiliently urged restraining dogs 50 is quite apparent.

In tapping and plugging the pipe with our improved apparatus the nipple 11 is first welded or otherwise attached to the pipe and the gate valve 20 is next installed on base nipple 11. A suitable drill is inserted within the socket 47 and the spindle elevated by means of the handwheel 33 sufficiently within the tubular member 12 to permit of attachment of the nipple to the upper port 24 of gate valve 11 which has been previously opened to permit of lowering the spindle to bring the drill into engagement with the pipe. A suitable wrench is placed on the outer end of the spindle A and the drilling operation commenced by rotating the spindle A and drill 17, the spindle nut 31 being rotated with the spindle and functioning in conjunction with bearing ring 30 as a thrust bearing for holding the drill 17 against the pipe. The pawl 41 is then lowered into engagement with the ratchet gear teeth 35 and the spindle A gradually fed in the direction of the pipe 18 by rotating the handwheel 33 in a clockwise direction. When the drill has pierced the pipe the spindle and drill are withdrawn by latching the pawl out of engagement with the ratchet, turning the handwheel in a counterclockwise direction while holding the spindle against rotation, by means of a wrench attached to its upper end 46. When the drill has been withdrawn beyond the gate valve 11 the same is closed, the drill mechanism thereabove, including the tubular member 12 is removed from the gate valve, the plug 57 substituted in the socket for the drill 17 and the mechanism reassembled. The gate valve is then opened and the plug lowered and tightly screwed into threaded opening 20 whereupon disengagement of the socket 47 from the stem 58 of the plug is effected by restraining the spindle from rotation with the aforementioned wrench while retracting the same vertically out of engagement with the stem against the opposition of the resilient stem retainer dogs 50 by rotating the handwheel 33 in a counterclockwise direction. The entire mechanism except for the nipple 10 and plug 57 may then be removed.

It will thus be seen that by the use of this particular arrangement of apparatus it is made possible to remove the gate valve along with the apparatus supported thereby. This represents a considerable economy since instead of leaving an expensive gate valve at each point where a pipe line is tapped, as is the case with the practice heretofore followed, we are enabled to use only one gate valve for all of the points where pipe tapping connections are made.

While we have described our invention in connection with a specific embodiment thereof, it is to be understood that this is by way of illustration rather than by way of limitation and we do not mean to be limited thereby further than as indicated by the appended claims which should be construed as broadly as the prior art will permit.

We claim:

1. In an apparatus for tapping and plugging a pipe containing fluid under pressure, including a spindle having a socket on its inner end for receiving interchangeably the stem of a drill and the stem of a plug and resiliently restraining the same against removal therefrom, means for housing and moving said spindle relative to the pipe to be tapped, said means comprising a tubular connector the inner end of which is adapted to be attached to said pipe and the outer end of which is exteriorly and interiorly threaded, a valve mounted on said connector, a second tubular member mounted on said valve, a rigid supporting frame comprising a lower base flange attached to said last named tubular member, a pair of opposed bars attached to and vertically extending from said base flange, a bearing ring rigidly attached to the upper ends of said side bars, a nut having threaded engagement with the upper portion of said spindle and being formed with a circular outer periphery mounted for rotation within said bearing ring, a handwheel connected with said nut for rotating the same about said spindle, and ratchet means associated with said spindle and nut for selectively locking the same against relative rotation.

2. The structure as defined in claim 1 wherein said socket comprises a longitudinally, cylindrically shaped depression formed in the lower end of said spindle, a tubular collar fitting tightly about the end of said spindle, a plurality of transverse radially disposed circular openings passing through said collar and through the wall of said cylindrical depression, spring actuated retaining dogs disposed in said opening, and an auxiliary collar surrounding said openings for retaining said spring actuated dog means in place.

3. In an apparatus for tapping and plugging a pipe containing fluid under pressure, including a spindle having a socket on its inner end comprising spring urged retaining dogs for receiving therebetween interchangeably the stem of a drill and the stem of a plug and resiliently restraining the same against removal therefrom, means for housing and moving said spindle relative to the pipe to be tapped, said means comprising a tubular pipe connector the lower portion of which is adapted to be attached to said pipe and the upper end of which is exteriorly and interiorly threaded, a valve mounted on said exterior threads of said nipple, a second tubular member mounted on said gate valve, a rigid supporting frame comprising a lower base flange attached to said last named tubular member, a pair of opposed bars attached to and vertically extending from said base flange, a bearing ring rigidly attached to the upper ends of said side bars, a nut having threaded engagement with the upper portion of said spindle and being formed with a circular outer periphery mounted for rotation within said bearing ring, a handwheel mounted on said nut for rotating the same about said spindle, and ratchet means associated with said spindle and nut for selectively locking the same against relative rotation.

4. An apparatus for tapping and plugging a pipe containing fluid under pressure, including a spindle having a socket on its inner end, said spindle comprising spring urged retaining dogs for receiving therebetween interchangeably the stem of a drill and the stem of a plug and resiliently restraining the same against removal therefrom, means for housing and moving said spindle relative to a pipe to be tapped, said means comprising a tubular pipe nipple the lower end of which is adapted to be welded to said pipe and the upper end of which is exteriorly and interiorly threaded, a valve mounted on the exterior of said nipple, and a second tubular member mounted on said valve, a rigid supporting frame comprising a circular lower base flange attached to said last named tubular member, said flange formed on its outer periphery with a pair of opposed arcuate recesses, a pair of arcuate shaped side bars extending vertically from said lower base flange member and having the lower ends thereof received within said recesses and welded thereto, a bearing ring embraced within the upper ends of said side bars and welded thereto, a nut having threaded engagement with the upper portion of said spindle and being formed with a circular outer periphery mounted for rotation within said bearing ring, a handwheel mounted on said nut for rotating the same about said spindle, and ratchet means associated with said spindle and nut for selectively locking the same against relative rotation.

5. An apparatus for tapping and plugging a pipe containing fluid under pressure, including a spindle having a socket on its inner end comprising spring urged retaining dogs for receiving therebetween interchangeably the stem of a drill and the stem of a plug and resiliently restraining the same against removal therefrom, means for housing and moving said spindle relative to the pipe to be tapped, said means comprising a tubular pipe nipple the inner end of which is adapted to be welded to said pipe and the outer end of which is exteriorly and interiorly threaded, a gate valve mounted on said exterior threads of said nipple, a second tubular member mounted on said gate valve, a rigid supporting frame comprising a lower base flange attached on its under side to said last named tubular member, and having a vertical opening therethrough containing packing for receiving the intermediate portion of said spindle, the outer periphery of said flange being generally circular and formed with a pair of substantially ninety degree arcuate recesses therein, a pair of substantially ninety degree arcuate longitudinal sections of pipe rigidly welded within said recesses, a bearing ring embraced by the upper ends of said pipe sections and welded thereto, a nut having threaded engagement with the upper portion of said spindle and being formed with a flange and adjoining reduced circular portion for engagement with said bearing ring, a handwheel mounted on said nut for rotating the same about said spindle, and ratchet means associated with said spindle and nut for selectively locking the same against relative rotation.

6. An apparatus for tapping and plugging a pipe containing fluid under pressure, including a spindle having a socket on its inner end comprising spring urged retaining dogs, said socket adapted to receive interchangeably the stem of a drill and the stem of a plug and resiliently restraining the same against removal therefrom, means for housing the intermediate and lower portion of said spindle and means for advancing and retracting said spindle relative to the pipe to be tapped, said housing means comprising a tubular pipe nipple the inner end of which is adapted to be attached to said pipe and the outer end of which is exteriorly and interiorly threaded, a gate valve mounted on said exterior threads of said nipple, a second tubular pipe nipple mounted on said gate valve, said advancing and retracting means including a rigid supporting frame, said frame comprising a lower base flange formed with a vertical threaded opening on the under side thereof for attachment to the upper end of said tubular housing, a concentrically disposed reduced opening above said threaded opening containing packing means for the reception of said spindle, vertically extending rigid side bars mounted on said base flange, a bearing ring embraceably received between the upper ends of said side bars and attached thereto, a spindle nut supported for rotation on said bearing ring, the upper portion of said spindle being threaded for reception within said nut, a handwheel keyed to said nut for rotating the same about said spindle to advance and retract the same relative to the pipe, a ratchet gear associated with said nut, a ratchet housing keyed to said spindle and embracing said ratchet gear, a pawl pivotally supported on said ratchet housing, a spring urging said pawl into engagement with said ratchet gear, and latch means for selectively restraining said pawl out of engagement with said ratchet.

7. In a pipe tapping and plugging apparatus, an arrangement of drill spindle and feeding mechanism for said spindle, adapted for cooperation with a valve and tubular connector attached to a pipe to be tapped and plugged, said arrangement including the provision on the end of said spindle adjacent said pipe of a socket adapted to receive interchangeably the stem of a drill and the stem of a plug to be inserted into the end of said tubular connector, said socket comprising resilient means for restraining said stems against egress from the socket, said support and feeding mechanism for said spindle comprising a tubular member adapted to be connected to said valve, a rigid frame mounted on said tubular member and comprising a lower supporting flange member formed with a concentric opening therethrough provided with packing means for receiving the intermediate portion of said spindle, rigid side bars extending upwardly from said lower supporting flange member and attached thereto, a thrust bearing ring attached to the upper ends of said side bars, a spindle nut mounted for rotation in said bearing, the upper portion of said spindle being threaded for reception within said nut, a handwheel keyed to said spindle nut for rotating the same relative to said spindle for advancing and retracting the same, a ratchet and pawl means associated with said spindle and nut for selectively locking the same against relative rotation.

8. In a pipe tapping and plugging apparatus, an arrangement of drill spindle, and feeding mechanism for said spindle, adapted for cooperation with a gate valve and tubular connector attached to a pipe to be tapped and plugged, said arrangement including the provision on the end of said spindle adjacent said pipe of a socket adapted to receive interchangeably the stem of a drill and the stem of a plug to be inserted into the end of said tubular connector, said socket comprising spring actuated retainer dogs for cooperation with depressions in the respective stems to resiliently restrain said stems against egress from the socket, said support and feeding mechanism for said spindle comprising a tubular member adapted to be connected to a gate valve, a rigid frame mounted on said tubular member and comprising a lower supporting flange member formed with a concentric opening therethrough, provided with packing means for receiving the intermediate portion of said spindle, rigid side bars extending upwardly from said lower supporting flange member and attached thereto, a thrust bearing ring positioned between and attached to the upper ends of said side bars, a spindle nut mounted for rotation in said bearing, the upper portion of said spindle being threadably received within said nut, a handwheel keyed to said spindle nut for rotating the same relative to said spindle for advancing and retracting the same, a ratchet gear mounted on said nut, a ratchet gear housing embracing said ratchet gear and keyed to said spindle to confine the same to vertical movement relative thereto, a pawl mounted on said ratchet housing and provided with spring means for normally urging the same into engagement with said ratchet gear for preventing relative movement between said spindle nut and said spindle latch, and means for selectively restraining said pawl out of engagement with said ratchet gear.

JAMES EDWIN POLSTON.
ARTHUR MILLER HILL.